Patented Aug. 27, 1929.

1,725,793

UNITED STATES PATENT OFFICE.

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY.

SUBSTITUTE FOR SHELLAC AND THE LIKE.

No Drawing.　　　Application filed June 8, 1926.　Serial No. 114,554.

The present invention relates to compositions of matter and method of obtaining them which are derived from the oil found in the shell of the cashew nut. The compositions or products are useful as substitutes for varnishes, lacquers and the like, as electrical insulation material, waterproofing, paper and cardboard finishing, as cements, and are useful in the arts generally.

The invention further consists in the new and novel features of operation and the new and original arrangements and combinations of steps in the process hereinafter described and more particularly set forth in the claims.

The invention also consists in forming a product having the general characteristics, the new and useful applications, and the several original features of utility hereinafter set forth and claimed.

According to the invention the oil which recurs naturally in the cellular shell or covering of the cashew nut is treated to produce a composition of matter which is highly useful in the arts generally and particularly for electrical insulation capable of withstanding increased temperatures, for impregnating paper and the like for making packages which are impervious to moisture, odors, for coating bottle corks and stopper, and so on. This oil, which hereinafter is referred to as cashew shell oil, in the natural state has a very high iodine member, about 290, but it does not oxidize readily, and will stand for an indefinite time in air without appreciable change of its iodine value, and without drying or oxidizing. On the other hand I have found that by reacting it with a metal or an oxygen bearing metal compound that compositions or products are obtainable which are highly stable, resistive to chemical action of dilute and concentrated acids such as nitric, or sulphuric or hydrochloric and to alkalis, which when applied with a vehicle such as naphtha, benzol or the like will dry quickly and adhere tenaciously to form a hard and highly flexible film, which are resistant to heat, and which have other highly desirable characteristics. It is not yet known whether the reactions accomplished are permanent reactions between the oil and the metal product, whether they are entirely catalytic, or whether they are in part both.

Examples of metals and metal compounds which are capable of reacting with the cashew shell oil or of causing reactions thereof are copper, aluminum, lead, and oxides, hydroxides or carbonates of these or other metals. A possible explanation of the change in the oil is that hydroxyl groups therein are partly or completely destroyed either in polymerization, cracking, oxidation reactions, replacement of the hydrogen atom with a metal atom or some group, or through some other reaction.

An example of a method of producing a useful product according to the invention follows. Nine parts of cashew shell oil by weight and one part of cupric carbonate are heated for about one hour at a temperature of about 140 degrees centigrade at atmospheric pressure with the result that the hydroxyl groups are substantially completely reacted with and the product has a substantially neutral reaction. The product, which is a liquid, is separated from remaining copper carbonate or other residuals and made into a varnish or lacquer by dissolving with benzol, naptha, alcohol or the like and applied to paper or fabric, and dried thereon to produce an electrically insulating coating material for wire coils and the like or is applied directly to wire and baked or otherwise dried thereon.

It is to be understood that cashew shell nut oil has been determined to be composed of cardol and anacardic acid and that the claims hereof which recite the use of cashew shell oil are intended to cover equivalent use of these materials from whatever their source whether natural or artificial.

Although I have set forth and described one process for producing my improved product, it is obvious that various changes may be made in the process or in the separate steps thereof without modifying or changing the essential features and characteristics of the products produced and that such products remain substantially with the same desirable characteristics although slight modifications may be made in the appearance, texture and in physical and chemical characteristics.

I claim:

1. The reaction product of cashew nut shell oil and cupric carbonate.

2. The reaction product of cashew nut shell oil, nine parts by weight and about one part of cupric carbonate heated for about one hour at about 140 degrees centigrade.

3. The method of treating cashew nut shell oil which comprises heating it at temperature up to about 140° C. with a metalliferous drying agent.

4. The method of treating cashew nut shell oil which comprises heating it at temperature up to about 140 C. with a drying agent which comprises an oxygen bearing metal compound.

5. The method of treating cashew nut shell oil which comprises heating it at temperature up to about 140° C. with copper carbonate.

6. The method of treating cashew nut shell oil which comprises heating it up to about 140° C. with cupric carbonate and then separating the resulting compound from any residue.

7. An oil which will dry to form a dry and flexible film having electrical insulating properties and which is infusible by heat, formed by heating cashew nut shell oil with cupric carbonate.

8. The method of converting cashew nut shell oil into a drying oil which comprises heating cashew nut shell oil in the presence of a drying agent comprising an oxygen bearing metal compound.

9. A liquid which will dry and which is obtained by heating cashew nut shell oil in contact with a metalliferous drying agent.

10. A liquid which will dry and which is obtained by heating cashew nut shell oil in contact with an oxygen containing metalliferous drying agent.

11. A composition of matter obtained by heating cashew nut shell oil in contact with an oxygen containing metalliferous drying agent.

12. In the manufacture of coating, impregnations and molded compositions, the method which comprises heating cashew nut shell oil in contact with an oxygen containing metalliferous drying agent.

In testimony whereof I have hereunto set my hand and seal.

MORTIMER T. HARVEY.